(12) United States Patent
Hariki et al.

(10) Patent No.: US 9,975,211 B2
(45) Date of Patent: May 22, 2018

(54) MACHINE TOOL

(71) Applicants: Ryo Hariki, Osaka (JP); Kouichi Kobayashi, Osaka (JP); Nobuyoshi Imasaki, Amagasaki (JP)

(72) Inventors: Ryo Hariki, Osaka (JP); Kouichi Kobayashi, Osaka (JP); Nobuyoshi Imasaki, Amagasaki (JP)

(73) Assignee: CITIZEN MACHINERY CO., LTD. (JP)

(*) Notice: Subject to any disclaimer, the term of this patent is extended or adjusted under 35 U.S.C. 154(b) by 0 days. days.

(21) Appl. No.: 14/102,243

(22) Filed: Dec. 10, 2013

(65) Prior Publication Data

US 2014/0102268 A1    Apr. 17, 2014

Related U.S. Application Data

(63) Continuation of application No. PCT/JP2012/077715, filed on Oct. 26, 2012.

(30) Foreign Application Priority Data

Nov. 10, 2011   (JP) .................................. 2011-246433

(51) Int. Cl.
*B23Q 1/00* (2006.01)
*B23Q 1/34* (2006.01)
(Continued)

(52) U.S. Cl.
CPC ............... *B23Q 1/34* (2013.01); *B23B 27/22* (2013.01); *B23B 29/125* (2013.01); *B23Q 5/22* (2013.01);
(Continued)

(58) Field of Classification Search
CPC ........ B23Q 1/34; B23Q 5/22; B23Q 15/0075; B23B 29/125; B23B 2260/108; B24B 1/04; G05B 2219/50216
See application file for complete search history.

(56) References Cited

U.S. PATENT DOCUMENTS 5,396,821 A *  3/1995  Okumura et al. ............... 82/1.3
7,788,998 B2 *  9/2010  Ethington et al. .............. 82/123
(Continued)

FOREIGN PATENT DOCUMENTS

JP    S4917790 B1    5/1974
JP    H06285701 A    10/1994
(Continued)

OTHER PUBLICATIONS

International Search Report Application No. PCT/JP2012/077715 Completed: Jan. 11, 2013; dated Jan. 22, 2013 1 page.

*Primary Examiner* — Will Fridie, Jr.
(74) *Attorney, Agent, or Firm* — St. Onge Steward Johnston & Reens LLC

(57) ABSTRACT

A machine tool for machining a workpiece is provided with a cutting tool holder for holding a cutting tool and a rotation mechanism for holding the workpiece. One or both of the cutting tool holder and the rotation mechanism are movable on multiple axes so that the cutting tool is movable relative to the workpiece in multiple axial directions. A control device is provided for controlling the movement of one or both of the cutting tool holder and the rotation mechanism to synchronously vibrate the workpiece and the cutting tool relative to each other at a low frequency in multiple axial directions.

5 Claims, 13 Drawing Sheets

(51) Int. Cl.
*B23B 29/12* (2006.01)
*B23B 27/22* (2006.01)
*G05B 19/404* (2006.01)
*B23Q 5/22* (2006.01)
*B23Q 5/28* (2006.01)
*G05B 19/4093* (2006.01)

(52) U.S. Cl.
CPC ............. *B23Q 5/28* (2013.01); *G05B 19/404* (2013.01); *G05B 19/40937* (2013.01); *B23Q 2230/004* (2013.01); *G05B 2219/45136* (2013.01); *Y02P 90/265* (2015.11); *Y10T 82/25* (2015.01); *Y10T 82/2502* (2015.01)

(56) References Cited

U.S. PATENT DOCUMENTS

| | | | |
|---|---|---|---|
| 7,861,624 B2* | 1/2011 | Kunimatsu et al. | ............ 82/1.11 |
| 2007/0276534 A1 | 11/2007 | Takahashi et al. | |

FOREIGN PATENT DOCUMENTS

| | | |
|---|---|---|
| JP | 2000052101 A | 2/2000 |
| JP | 2004058235 A | 2/2004 |
| JP | 2007307663 A | 11/2007 |
| WO | 9423869 A1 | 10/1994 |

* cited by examiner

Fig. 3

| Program setting value | | | Stored data VC_TBL | | | |
|---|---|---|---|---|---|---|
| Number of revolutions (rpm) | Feed per revolution (mm) | Advance distance (mm) | Retreat distance (mm) | Forward speed (mm/min) | Rearward speed (mm/min) | Vibration frequency (Hz) |
| ∶ | ∶ | ∶ | ∶ | ∶ | ∶ | ∶ |
| 1000 | 0.005 | 0.035 | 0.03 | 290 | 290 | 25 |
| | 0.01 | 0.04 | 0.03 | 300 | 300 | 25 |
| | 0.015 | 0.045 | 0.03 | 350 | 350 | 25 |
| 1100 | 0.005 | 0.035 | 0.03 | 290 | 290 | 27 |
| | 0.01 | 0.04 | 0.03 | 300 | 300 | 27 |
| | 0.015 | 0.045 | 0.03 | 350 | 350 | 27 |
| ∶ | ∶ | ∶ | ∶ | ∶ | ∶ | ∶ |

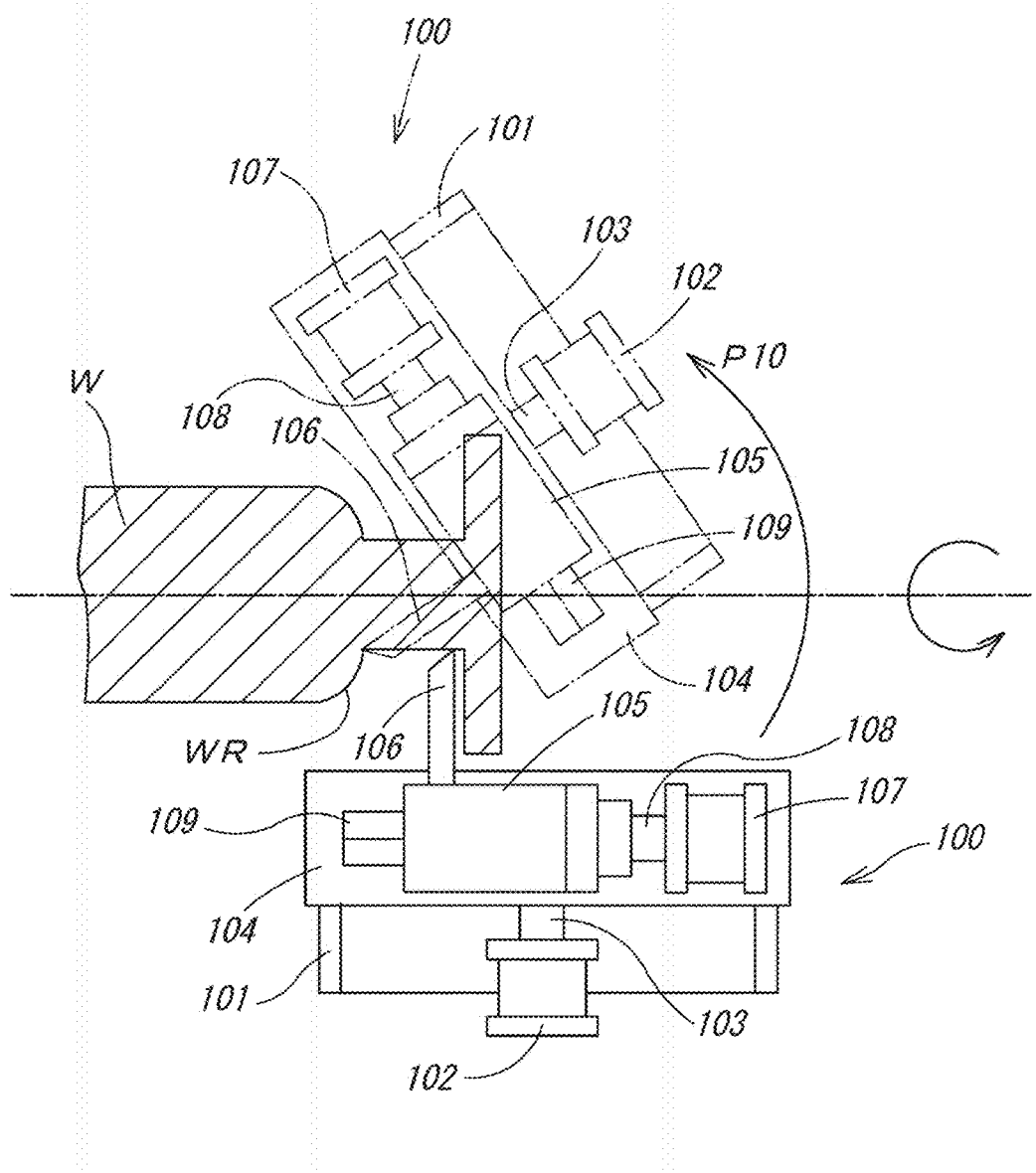

MACHINE TOOL

FIELD OF THE INVENTION

The present invention relates to machine tools which rotate a cutting tool or a workpiece and perform cutting of the workpiece.

BACKGROUND OF THE INVENTION

In conventional machine tools, a cutting tool, such as a turning tool, moves relative to a workpiece in a fixed direction to cut the workpiece. On the other hand, there is known a machine tool which performs so-called ultrasonic vibration cutting, which uses a piezoelectric element at a cutting edge of a cutting tool and cuts a workpiece while applying vibration in an ultrasonic range (for example, as disclosed in Japanese Published Unexamined Patent Application No. 2000-052101). Further, there is known a machine tool in which a vibration exciter is attached to a cutting tool, as disclosed in Japanese Published Examined Patent Application No. S49-17790, which will be described with reference to FIG. 13. The machine tool 100, depicted in FIG. 13, has a first guideway 101. This first guideway 101 guides a tool rest 104 coupled to a piston rod 103 of an oil hydraulic cylinder 102 so as to move perpendicular to an axial center O of a workpiece W. The machine tool 100 also has a vibration exciter 105. This vibration exciter 105 has a vibration mechanism for generating vibration in a feed direction parallel to the axial center O of the workpiece W, and a device for attachably and detachably fixing a cutting tool 106. The vibration exciter 105 is also coupled to a piston rod 108 of a feed cylinder 107 and is movable in the feed direction at a second guideway 109 fixed on the tool rest 104. By vibrating the machine tool 100 configured as above, the cutting of the workpiece W rotating about the axial center O is performed.

SUMMARY OF THE INVENTION

In conventional machine tools, the machine tool performing the conventional cutting moves the cutting tool such as a turning tool relative to the workpiece in a fixed direction and cuts the workpiece. There is a problem that cutting heat and frictional heat generated at that time cannot be cooled and lubricated effectively, which causes a cutting edge of the cutting tool to be remarkably worn out and then machining quality of workpieces to be uneven. In addition, there is also a problem that chips generated at the time of cutting get caught on the cutting tool, which causes not only unevenness in the quality but also the occurrence of fire.

On the other hand, the machine tool performing the ultrasonic vibration cutting has an advantage of allowing cutting of difficult-to-cut materials, but takes significant machining time and additionally is very expensive. Moreover, there is a problem that tooling installation sites having a role as an adapter for attaching the cutting tool to the machine tool are restricted due to use of the piezoelectric element. Therefore, there is a problem that the machine tool performing the ultrasonic vibration cutting disadvantageously lacks practical use.

In addition, the machine tool having the vibration exciter attached to the cutting tool has a problem that the machining shape of workpieces is limited. More specifically, because the machine tool 100 is attached with the vibration exciter 105, the cutting tool 106 can be moved vertically and horizontally only. When a workpiece is attempted to be formed into the machining shape of the workpiece W shown in FIG. 13, the machine tool 100 needs to be rotated in a direction of arrow P10 and then perform cutting at the time of cutting a circular arc portion WR of the workpiece W. However, as a matter of fact, the machine tool 100 interferes with the workpiece W or other machines not shown in FIG. 13 if attempted to be rotated in the direction of arrow P10. Therefore, the rotation in the direction of arrow P10 is physically impossible. As a result, the machine tool having the vibration exciter attached to the cutting tool has the problem that the machining shape of workpieces is limited.

Therefore, to solve the problems as above, a change of design so as to use an NC turning machine, to perform low-frequency vibration cutting can be conceived, as described in Japanese Published Unexamined Patent Application No. H6-285701. More specifically, this NC turning machine repeats, by a servomotor, operation of moving a tool by a predetermined distance, temporarily stopping the tool, and reversing the tool by a predetermined distance, thereby fragmenting chips into ones long in length to some degree and then cutting the workpiece. It can be therefore conceived of applying this operation, repeating advance and reverse without stopping the movement of the tool, and making the tool cut with low-frequency vibration.

However, there is a problem that, if attempting to make the NC turning machine as above simply vibrate at low frequency on multiple axes, the expected control cannot be obtained and the low-frequency vibration cannot be achieved, that is, low-frequency vibration cutting capable of finely fragmenting chips cannot be realized.

Accordingly, in view of the foregoing problems, the present invention aims to provide a machine tool capable of making machining quality of workpieces mainly composed of difficult-to-cut materials stable at a high level and also capable of inhibiting the occurrence of a fire, and yet, being practical and having no restrictions on machining shape of workpieces, and furthermore being capable of realizing low-frequency vibration cutting which allows chips to be fragmented finely even if the cutting tool and/or the workpiece is vibrated at low frequency on multiple axes.

The foregoing object of the present invention will be achieved by the following means. It is noted that numerals in parentheses are reference numerals of embodiments described later but the present invention should not be restricted thereto.

A machine tool according to a first embodiment is characterized by a cutting tool holding means (a cutting tool holder 5 and a rotation mechanism 31) holding a cutting tool (4) for machining a workpiece (2), a workpiece holding means (a rotation mechanism 3 and a workpiece chuck mechanism 32) holding the workpiece (2), wherein the cutting tool holding means (the cutting tool holder 5 and the rotation mechanism 31) or the workpiece holding means (the rotation mechanism 3 and the workpiece chuck mechanism 32) is provided movably so as to feed the cutting tool (4) relative to the workpiece (2) in multiple axial directions, and a control mechanism (a control device 8) for controlling operation of the cutting tool holding means (the cutting tool holder 5 and the rotation mechanism 31) or the workpiece holding means (the rotation mechanism 3 and the workpiece chuck mechanism 32) so as to relatively synchronize the workpiece (2) and the cutting tool (4) in multiple axial directions and vibrate them at low frequency.

On the other hand, a machine tool according to another embodiment is characterized in that the cutting tool holding means (the cutting tool holder 5 and the rotation mechanism 31) is provided movably in multiple axial directions in the foregoing machine tools.

Further, a machine tool according to another embodiment is characterized in that the workpiece holding means (the rotation mechanism 3 and the workpiece chuck mechanism 32) is provided movably in multiple axial directions in the foregoing machine tools.

Still further, a machine tool according to another embodiment is characterized in that, in the foregoing machine tools, the cutting tool holding means (the cutting tool holder 5) and the workpiece holding means (the rotation mechanism 3) are provided movably so that the cutting tool holding means (the cutting tool holder 5) and the workpiece holding means (the rotation mechanism 3) cooperatively move to feed the cutting tool (4) relative to the workpiece (2) in multiple axial directions.

On the other hand, a machine tool according to another embodiment is characterized by, in the foregoing machine tools, a vibration cutting information storing means (a vibration cutting information storing portion 83) in which data for vibrating the workpiece (2) and the cutting tool (4) at low frequency is prestored, wherein the control mechanism (the control device 8) exercises control based on the data stored in the vibration cutting information storing means (the vibration cutting information storing portion 83).

Next, effects of the present invention will be described. It is noted that numerals in parentheses are reference numerals of embodiments described later but the present invention should not be restricted thereto.

In the machine tool according to an embodiment of the invention, the movement of the cutting tool holding means (the cutting tool holder 5 and the rotation mechanism 31) or the workpiece holding means (the rotation mechanism 3 and the workpiece chuck mechanism 32) is controlled by the control mechanism (the control device 8) so as to relatively synchronize the workpiece (2) and the cutting tool (4) in multiple axial directions and vibrate them at a low frequency. As a result, cavitation is generated in a space (K) (see FIG. 1 etc.) appearing between the workpiece (2) and the cutting tool (4), into which a coolant etc., used at the time of performing the cutting is sucked. Therefore, cutting heat and frictional heat generated at the time of machining the workpiece (2) can be cooled and lubricated effectively. Thus, according to the present invention, machining quality of workpieces can be stabilized.

Further, according to the present invention, chips of the workpiece (2) become powdered by the low-frequency vibration at the time of cutting the workpiece (2) by the cutting tool (4), and this makes it difficult for the chips to catch on the cutting tool. Consequently, the quality can be stabilized and furthermore the occurrence of a fire can be suppressed.

Besides, according to an embodiment of the invention, control is exercised only by using the control mechanism (the control device 8) when the workpiece (2) and the cutting tool (4) are relatively synchronized in multiple axial directions and vibrated at a low frequency. Thus, the invention is practical due to the simple structure, and yet, the effect is performed that the machining shape of workpieces is not limited.

According to an embodiment of the invention, the movement of the cutting tool holding means (the cutting tool holder 5 and the rotation mechanism 31) or the workpiece holding means (the rotation mechanism 3 and the workpiece chuck mechanism 32) is controlled by the control mechanism (the control device 8), and when the workpiece (2) and the cutting tool (4) are fed relative to each other in multiple axial directions, the workpiece (2) and the cutting tool (4) are fed synchronously and vibrated at a low frequency. As a result, the low-frequency vibration cutting capable of finely fragmenting chips can be realized.

Further, in the machine tools as above, the cutting tool holding means (the cutting tool holder 5 and the rotation mechanism 31) can be provided movably in multiple axial directions. Further, the workpiece holding means (the rotation mechanism 3 and the workpiece chuck mechanism 32) can be provided movably in multiple axial directions. Furthermore, the cutting tool holding means (the cutting tool holder 5) and the workpiece holding means (the rotation mechanism 3) can be provided movably so that the cutting tool holding means (the cutting tool holder 5) and the workpiece holding means (the rotation mechanism 3) can cooperatively move to feed the cutting tool (4) relative to the workpiece (2) in multiple axial directions as in the machine tool according to the invention.

On the other hand, as in the machine tools according to the invention, the provision of the vibration cutting information storing means (the vibration cutting information storing portion 83) in which data for vibrating the workpiece (2) and the cutting tool (4) at a low frequency in the above manner is prestored allows the control mechanism (the control device 8) to exercise control based on the data stored in the vibration cutting information storing means (the vibration cutting information storing portion 83). Consequently, the low-frequency vibration cutting with optimum vibration capable of finely fragmenting chips can be achieved. More specifically, the frequency is determined by the amplitude and the interpolation speed thereof in theory. Practically, however, the relationship between the amplitude or the interpolation speed thereof and the frequency varies variously depending on mechanical characteristics (for example, theoretical mass, motor characteristics, etc.) of the machine tool, and is not a fixed relationship such as proportional relation. Thus, desired vibration (optimum frequency and amplitude) cannot be generated by theoretical calculations. Further, if the low-frequency vibration cutting is attempted to be realized with the aim of fragmenting chips, the number of revolutions of the workpiece or the number of revolutions of the cutting tool and a cycle at the time of performing the low-frequency vibration cutting need to be set so as not to be synchronized. However, it is extremely difficult to work out such a cycle by calculation. Therefore, if data for vibrating the workpiece (2) and the cutting tool (4) at low frequency in the above manner is prestored in the vibration cutting information storing means (the vibration cutting information storing portion 83) and the control mechanism (the control device 8) is made to exercise control based on the data, the low-frequency vibration cutting can be realized with optimum vibration capable of finely fragmenting chips.

It is noted that low frequency herein shall mean a range from larger than 0 Hz to 1000 Hz or less.

BRIEF DESCRIPTION OF THE DRAWINGS

FIG. 3 is a table stored in a vibration cutting information storing portion of the same embodiment.

FIG. 13 is an explanatory diagram showing a schematic configuration of a conventional machine tool.

DETAILED DESCRIPTION OF THE INVENTION

Hereinafter, the first embodiment according to the present invention will be described in detail with reference to FIGS. 1 to 5.

Figure 1:
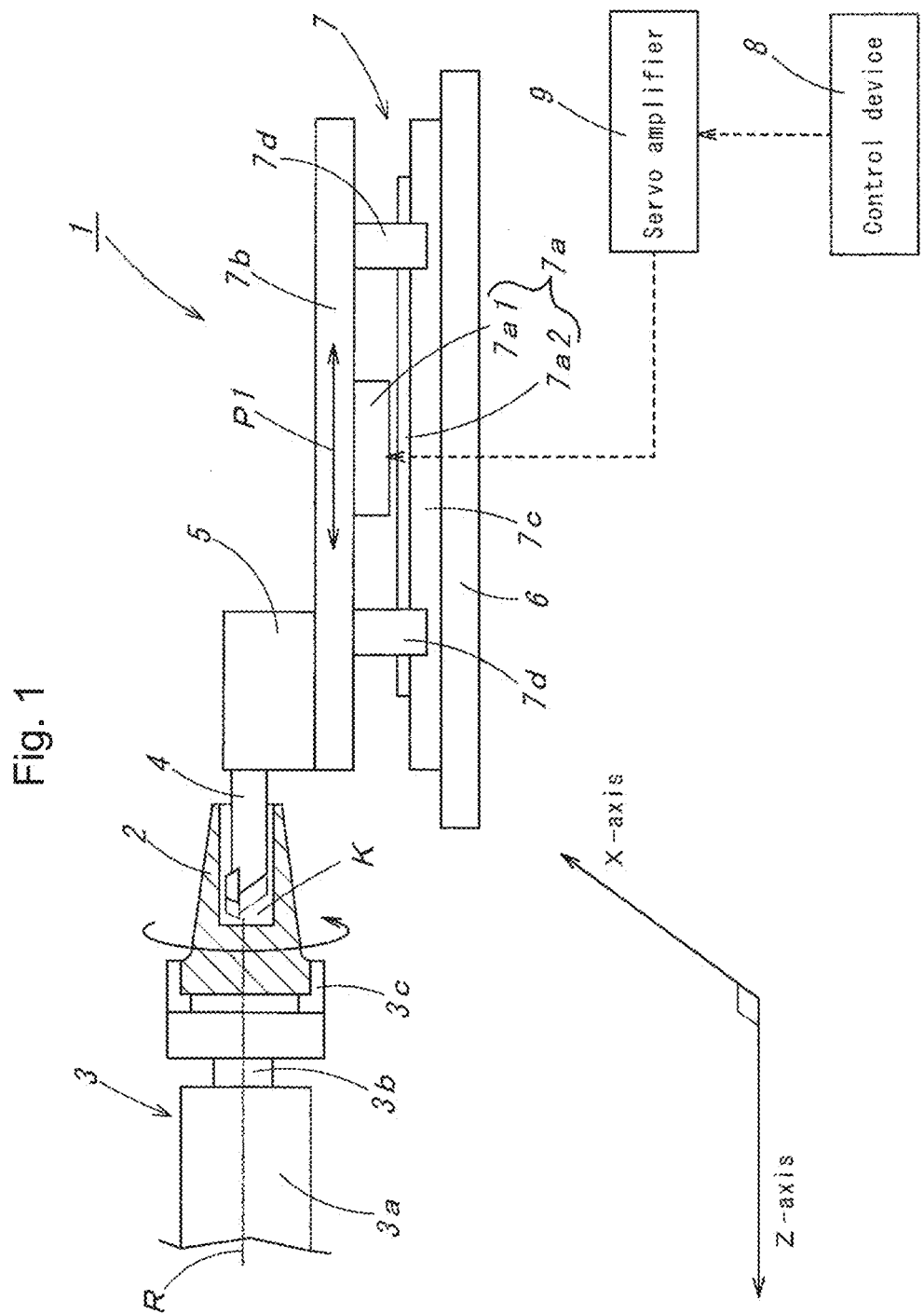
FIG. 1 is a block diagram showing a schematic configuration of a machine tool according to the first embodiment of the present invention.

A machine tool 1 according to the present embodiment is composed of a CNC lathe, and as shown in FIG. 1, includes a rotation mechanism 3 for rotatably supporting a workpiece 2 which is an object to be machined, a cutting tool feeding mechanism 7 provided on a base 6 and on which a cutting tool holder 5 holding a cutting tool 4 (a turning tool in the drawing) for cutting the workpiece 2 is placed, and a control device 8 for controlling the operation of the cutting tool feeding mechanism 7 via a servo amplifier 9 so as for the cutting tool 4 to vibrate at a desired low frequency. It is noted that only the cutting tool feeding mechanism 7 on the Z-axis is shown in FIG. 1 but the machine tool also has a cutting tool feeding mechanism on the X-axis orthogonal thereto.

The foregoing rotation mechanism 3 has a spindle motor 3a, and to a main shaft 3b of that spindle motor 3a, a chuck mechanism 3c is rotatably attached. The workpiece 2 which is an object to be machined is gripped by the chuck mechanism 3c, and the gripped workpiece 2 is configured to be rotationally driven about a rotation axis R by rotation drive of the spindle motor 3a.

On the other hand, the foregoing cutting tool feeding mechanism 7 has a cutting tool feed drive motor 7a composed of a linear servomotor which is a driving source for feeding the cutting tool 4 advanceably and retreatably (see arrow P1) with respect to the workpiece 2. This cutting tool feed drive motor 7a is constituted of a needle 7a1 and a stator 7a2. The needle 7a1 is formed by winding an exciting coil around a magnetic substance structure, and the stator 7a2 is formed by lining up multiple magnets in the longitudinal direction.

This needle 7a1 is provided on a lower portion of a table 7b on which the cutting tool holder 5 is placed, and the stator 7a2 is provided on an upper portion of a guide rail 7c provided on the base 6. On the lower portion of the table 7b, a pair of guides 7d guiding the table 7b so as to move along the guide rail 7c is provided.

To move the thus configured cutting tool feeding mechanism 7 advanceably and retreatably (see arrow P1) with respect to the workpiece 2, the servo amplifier 9 delivers to the needle 7a1 a current based on a command having been sent from the control device 8, first. By this, magnetic poles of the needle 7a1 and stator 7a2 attract and repel each other, and then, thrust in the front-rear direction (see arrow P1) is generated. Accompanying the thrust, the table 7b moves in the front-rear direction (see arrow P1). In the movement of the table 7b accompanying the thrust, the pair of guides 7d are provided, so that the table 7b moves along the guide rail 7c through means of the pair of guide 7d. As a result, the cutting tool feeding mechanism 7 can be moved advanceably and retreatably (see arrow P1) with respect to the workpiece 2. Further, the linear servomotor is used as the cutting tool feed drive motor 7a in the present embodiment. However, not restricted thereto, any linear motor may be used. Further, not restricted to the linear motors, servomotors may be used. However, ball screws are used at the time of employing the servomotors. Thus, vibration is absorbed if backlash occurs during the advance and retreat movement of the cutting tool feeding mechanism 7. Accordingly, it is preferable to use the linear motors allowing direct control and not requiring ball screws etc.

Figure 2:
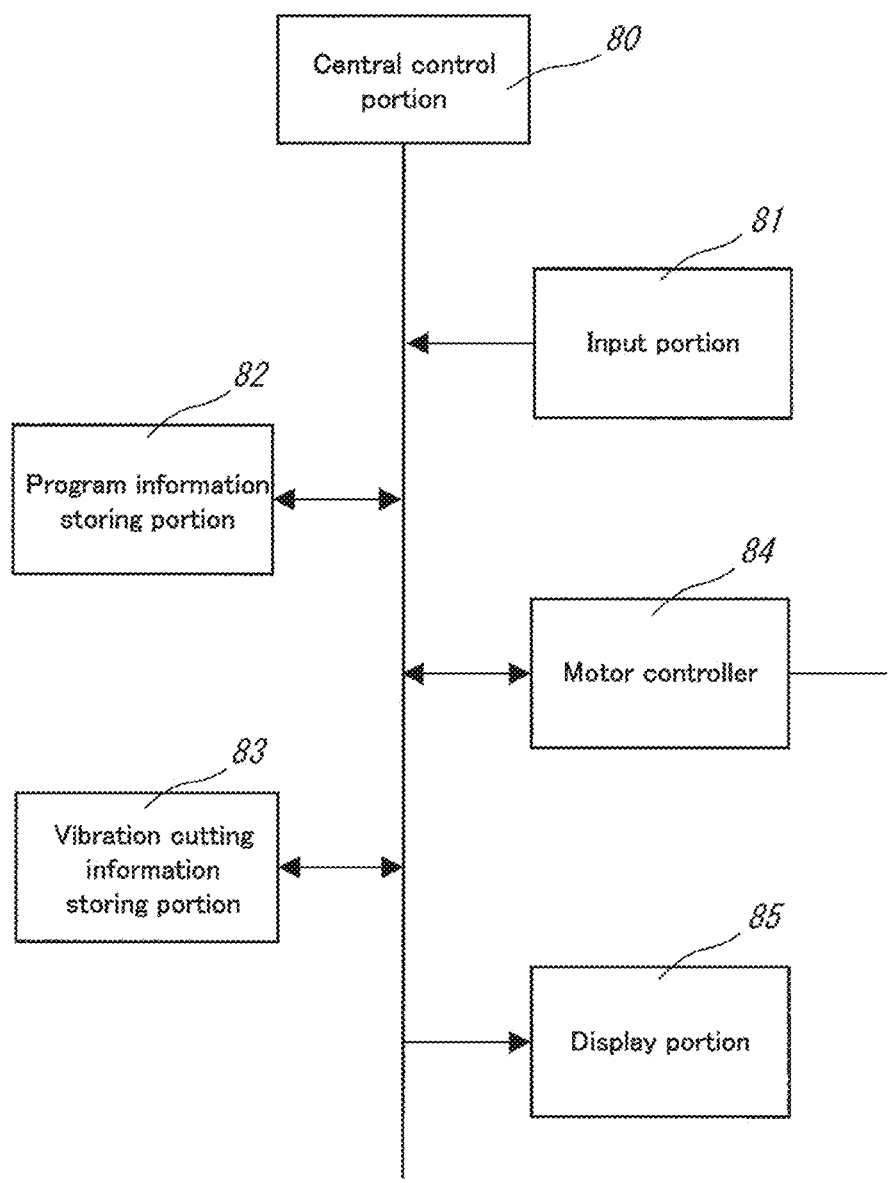
FIG. 2 is a block diagram of a control device of the same embodiment.

Now, the control device 8 will be described in more detail using FIG. 2 and FIG. 3. As shown in FIG. 2, the control device 8 is constituted of a central control portion 80 composed of a CPU etc., an input portion 81 composed of a touch panel etc., a program information storing portion 82 for storing program information which a user has programmed by using the input portion 81, a vibration cutting information storing portion 83 in which data for synchronizing the cutting tool 4 in multiple axial directions (two axial directions of the X-axis and the Z-axis in the drawing), feeding the cutting tool 4, and then vibrating the cutting tool 4 at low frequency is stored, a motor controller 84 controlling operation of the cutting tool feed drive motor 7a via the servo amplifier 9, and a display 85 composed of a liquid crystal monitor etc.

The vibration cutting information storing portion 83 stores a vibration cutting information table VC_TBL shown in FIG. 3. More specifically, data (an advance distance (mm) of the cutting tool feeding mechanism 7, a retreat distance (mm) of the cutting tool feeding mechanism 7, a forward speed (mm/min) of the cutting tool feeding mechanism 7, a rearward speed (mm/min) of the cutting tool feeding mechanism 7, and a vibration frequency (Hz) of the cutting tool 4) corresponding to program setting values (the number of revolutions of the workpiece 2 (rpm) and a feed of the cutting tool 4 per revolution of the workpiece 2 (mm)) is stored in the vibration cutting information table VC_TBL. A more detailed description will be given. Where a user uses the input portion 81 and programs the number of revolutions of the workpiece 2 at 1000 (rpm) for example, three different feeds, 0.005 (mm), 0.01 (mm), and 0.015 (mm) can be set as the feed of the cutting tool 4 per revolution of the workpiece 2 appropriate to the number of revolutions of the workpiece 2, 1000 (rpm). In the vibration cutting information table VC_TBL, advance distances of the cutting tool feeding mechanism 7 (0.035 (mm), 0.04 (mm), and 0.045 (mm)), retreat distances of the cutting tool feeding mechanism 7

(0.03 (mm), 0.03 (mm), and 0.03 (mm)), forward speeds of the cutting tool feeding mechanism 7 (290 (mm/min), 300 (mm/min), and 350 (mm/min)), rearward speeds of the cutting tool feeding mechanism 7 (290 (mm/min), 300 (mm/min), and 350 (mm/min)), and vibration frequencies of the cutting tool 4 (25(Hz), 25 (Hz), and 25 (Hz)) corresponding to those feeds (0.005 (mm), 0.01 (mm), and 0.015 (mm)) are stored. As above, the advance distance (mm) of the cutting tool feeding mechanism 7, the retreat distance (mm) of the cutting tool feeding mechanism 7, the forward speed (mm/min) of the cutting tool feeding mechanism 7, the rearward speed (mm/min) of the cutting tool feeding mechanism 7, and the vibration frequency (Hz) of the cutting tool 4 corresponding to the number of revolutions (rpm) and the feed per revolution (mm) thereof having been programmed by the user by means of the input portion 81 are stored in the vibration cutting information table VC_TBL.

Therefore, when the user uses the input portion 81 and programs the number of revolutions of the workpiece 2 at 1000 (rpm) and the feed of the cutting tool 4 per revolution of the workpiece 2 at 0.005 (mm) for example, the advance distance of the cutting tool feeding mechanism 7, 0.035 (mm), the retreat distance of the cutting tool feeding mechanism 7, 0.03 (mm), the forward speed of the cutting tool feeding mechanism 7, 290 (mm/min), and the rearward speed of the cutting tool feeding mechanism 7, 290 (mm/min) are selected. Based on the selected data, the motor controller 84 controls the operation of the cutting tool feed drive motor 7a via the servo amplifier 9, so that the cutting tool 4 vibrates at low frequency. Further, the vibration frequency, 25 (Hz), of the cutting tool 4 stored in the vibration cutting information table VC_TBL is displayed at the display 85 and has nothing to do with the low-frequency vibration of the cutting tool 4. Therefore, the vibration frequency of the cutting tool 4 does not need to be stored in the vibration cutting information table VC_TBL. However, it is preferable to store the vibration frequency of the cutting tool 4 since the user can readily and easily check the vibration frequency (Hz) of the cutting tool 4 corresponding to the number of revolutions of the workpiece 2 (rpm) and the feed (mm) of the cutting tool 4 per revolution of the workpiece 2 which the user has programmed.

It is noted that the values stored in the vibration cutting information table VC_TBL having been instructed in the present embodiment are only illustrated by examples, and a wide variety of values according to mechanical characteristics of machine tools can be prestored.

In addition, these values according to mechanical characteristics of machine tools are determined by experimental operation of the machine tools in advance and collecting the experimental data.

Figure 4:
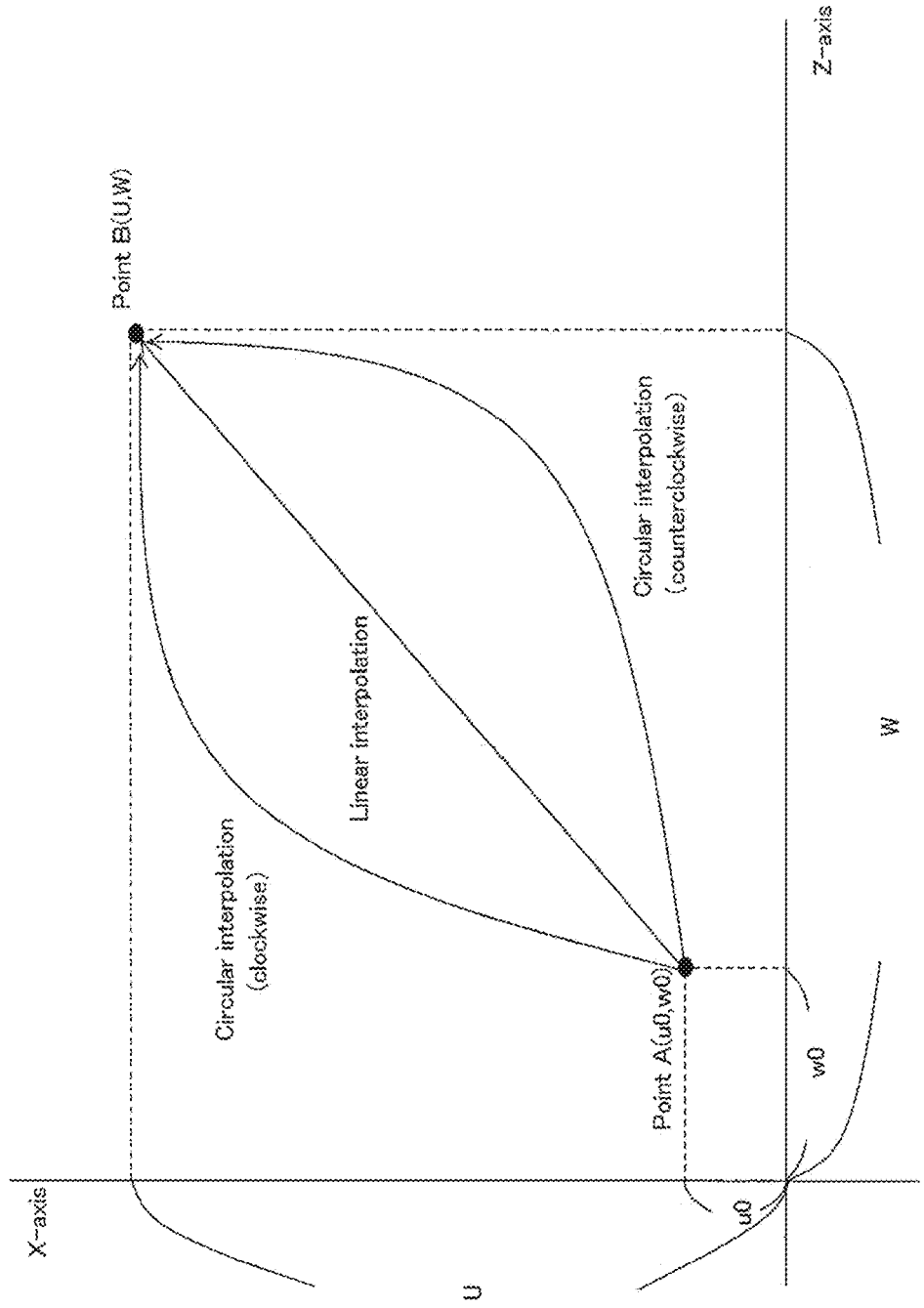
FIG. 4 is an explanatory diagram showing an instance of moving a cutting tool according to the same embodiment from Point A to Point B by a linear interpolation etc.
Figure 5:
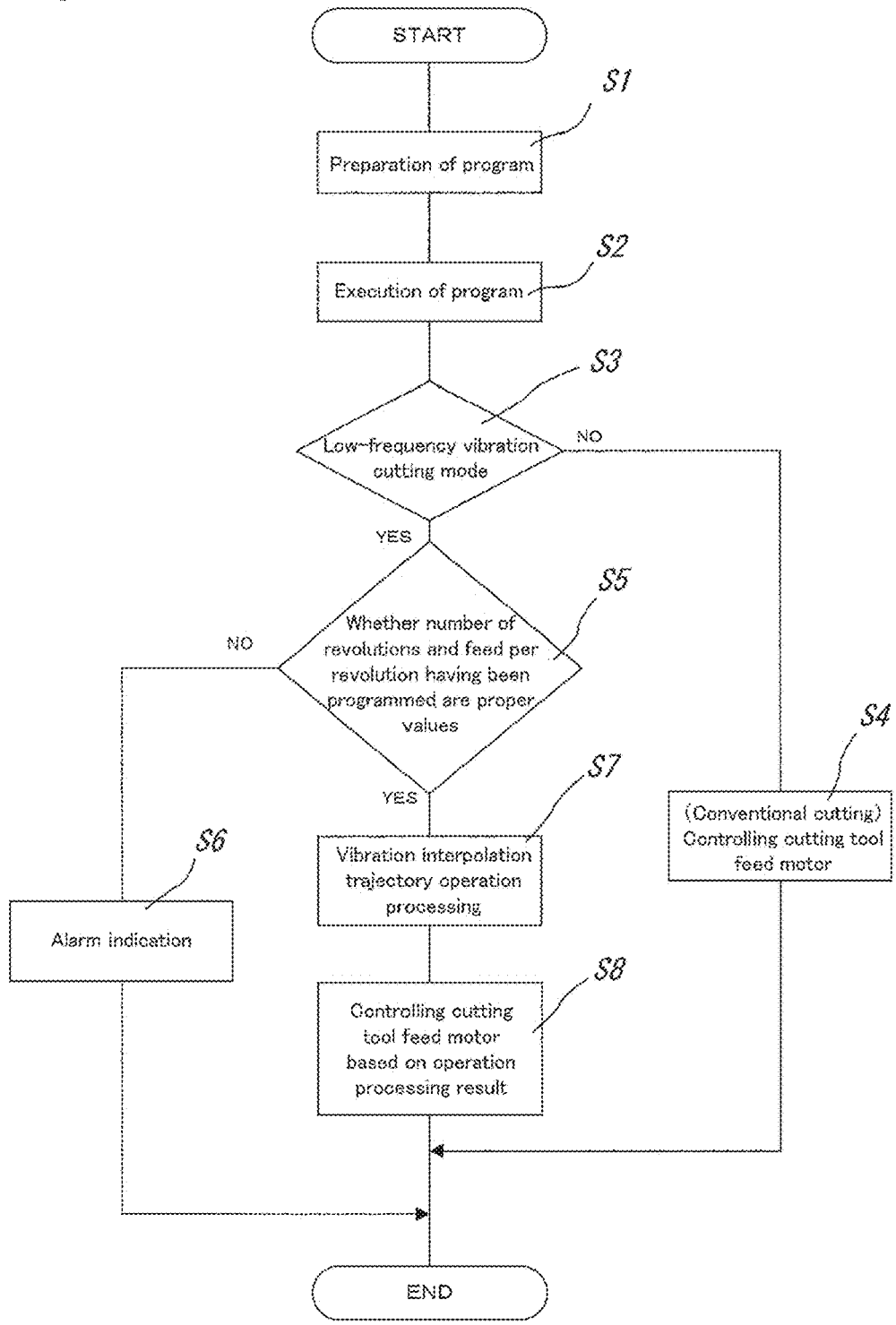
FIG. 5. is a flow chart showing an example of use of the machine tool according to the same embodiment.

Next, as an example of use of the machine tool 1 according to the present embodiment, a method for synchronizing the cutting tool 4 in two axial directions of the X-axis and the Z-axis and moving the cutting tool 4 from Point A (u0, w0) to Point B (U, W) shown in FIG. 4 will be described using FIG. 5. Herein, Point A denotes a current position of the cutting tool 4.

First, the user uses the input portion 81 and prepares a program using NC language. Specifically, the number of revolutions of the workpiece 2 is input, and an input of a vibration cutting command code at the time of performing the low-frequency vibration cutting from the normal cutting (the conventional cutting) is done. As a matter of course, the input of the vibration cutting command code is not done if the low-frequency vibration cutting is not performed.

Further, the user uses the input portion 81 and enters Point B (U, W) which is a destination of the cutting tool 4. On the occasion of the movement to Point B, an input of an interpolation method whether the cutting tool 4 is moved with linear interpolation or with clockwise circular interpolation or with counterclockwise circular interpolation, an input of a radius if circular interpolation, and an input of a feed of the cutting tool 4 per revolution of the workpiece 2 are programmed using NC language. Specifically illustrating this program, it can be described as follows, for example.

<NC Program>
S1000 (the number of revolutions of workpiece 2);
M123 (code of vibration cutting ON);
G1 (linear interpolation) XU ZW (coordinate value to destination)
F0.01 (feed of cutting tool 4 per revolution of workpiece 2);
or
G2 (circular interpolation (clockwise)) XU ZW (coordinate value to destination)
R10.0 (arc radius)
F0.01 (feed of cutting tool 4 per revolution of workpiece 2);
or
G3 (circular interpolation (counterclockwise)) XU ZW (coordinate value to destination))
R10.0 (arc radius)
F0.01 (feed of cutting tool 4 per revolution of workpiece 2);
M456 (code of vibration cutting OFF);

In the foregoing NC program, the number of revolutions of the workpiece 2 is programmed at 1000 (rpm) by describing "S1000," first. Then, the vibration cutting is set to be ON by describing "M123." When the cutting tool 4 is linearly interpolated to Point B, by describing "G1 XU ZW" and further describing "F0.01," the feed of the cutting tool 4 per revolution of the workpiece 2 is programmed at 0.01 (mm).

On the other hand, when the cutting tool 4 is circularly interpolated to Point B (in the clockwise direction), by describing "G2 XU ZW" and then "R10.0," the arc radius at the time of the circular interpolation is programmed at 10.0 (mm). Further, by describing "F0.01," the feed of the cutting tool 4 per revolution of the workpiece 2 is programmed at 0.01 (mm).

On the other hand, when the cutting tool 4 is circularly interpolated to Point B (in the counterclockwise direction), by describing "G3 XU ZW" and then "R10.0," the arc radius at the time of the circular interpolation is programmed at 10.0 (mm). Further, by describing "F0.01," the feed of the cutting tool 4 per revolution of the workpiece 2 is programmed at 0.01 (mm).

After the thus program is described, the vibration cutting is set to be OFF by describing "M456." Further, the vibration cutting command codes of "M123" and "M456" do not need to be described when the vibration cutting is not performed and the normal cutting (the conventional cutting) is performed.

Upon preparation of the above program in this manner, the central control portion 80 stores the prepared program in the program information storing portion 82 (Step S1). It is noted that "M123" and "M456" in the foregoing NC program are only examples and can be changed to given codes.

After the preparation of the program, the user uses the input portion 81 and commands the execution of the prepared program (Step S2). With this, the central control portion 80 reads the program stored in the program information storing portion 82 and checks a cutting mode (Step S3).

When the cutting mode is a mode of performing the normal cutting (the conventional cutting) (when the vibration cutting command code "M123" is not programmed) (Step S3: NO), the central control portion 80 performs interpolation trajectory operation processing based on the programmed interpolation method to Point B (U, W) which is the destination of the cutting tool 4, and outputs the operation result to the motor controller 84. The motor controller 84 having received the information moves the cutting tool 4 from Point A (u0, w0) to Point B (U, W) along the interpolation trajectory based on the information by controlling the cutting tool feed drive motor 7a via the servo amplifier 9 (Step S4). After that, the central control portion 80 terminates the information processing.

On the other hand, when the cutting mode is a mode of performing the low-frequency vibration cutting (when the vibration cutting command code of "M123" is programmed) (Step S3: YES), the central control portion 80 checks if the number of revolutions of the workpiece 2 and the feed of the cutting tool 4 per revolution of the workpiece 2 matched with the program setting values in the vibration cutting information table VC_TBL stored in the vibration cutting information storing portion 83 are programmed or not (Step S5). If the program setting matched with the program setting values in the vibration cutting information table VC_TBL is not made (Step S5: NO), the central control portion 80 has the display 85 display an alarm to the effect that proper values are not programmed (Step S6) and terminates the processing. More specifically, for example, if the user uses the input portion 81 and programs the number of revolutions of the workpiece 2 at 1000 (rpm) and the feed of the cutting tool 4 per revolution of the workpiece 2 at 0.020 (mm), as is obvious from the vibration cutting information table VC_TBL shown in FIG. 3, the feed of the cutting tool 4 per revolution of the workpiece 2, 0.020 (mm), is not matched with the program setting values of the feed of the cutting tool 4 per revolution of the workpiece 2 (0.005 (mm), 0.01 (mm), and 0.015 (mm)) appropriate to the number of revolutions of the workpiece 2, 1000 (rpm). Therefore, the central control portion 80 has the display 85 display the alert warning to the effect that proper values are not programmed. Consequently, the user can program an appropriate feed of the cutting tool 4 per revolution of the workpiece 2.

On the other hand, if the program setting matched with the program setting values in the vibration cutting information table VC_TBL is made (Step S5: YES), the central control portion 80 selects, from the vibration cutting information table VC_TBL stored in the vibration cutting information storing portion 83, the advance distance of the cutting tool feeding mechanism 7, the retreat distance of the cutting tool feeding mechanism 7, the forward speed of the cutting tool feeding mechanism 7, the rearward speed of the cutting tool feeding mechanism 7, and the vibration frequency of the cutting tool 4 corresponding to the number of revolutions of the workpiece 2 and the feed of the cutting tool 4 per revolution of the workpiece 2 having been programmed by the user by means of the input portion 81. Further, the central control portion 80 performs operation processing on advance and retreat movement along the interpolation trajectory according to the program information on the interpolation method to Point B which is the destination of the cutting tool 4, stored in the program information storing portion 82 and the above selected information (the advance distance of the cutting tool feeding mechanism 7, the retreat distance of the cutting tool feeding mechanism 7, the forward speed of the cutting tool feeding mechanism 7, and the rearward speed of the cutting tool feeding mechanism 7). The central control portion 80 then outputs the operation result to the motor controller 84 and concurrently outputs the above selected vibration frequency of the cutting tool 4 to the display 85 (Step S7).

The motor controller 84 having received such operation result controls the cutting tool feed drive motor 7a via the servo amplifier 9 based on the information and vibrates the cutting tool 4 at low frequency. That is, the motor controller 84 performs processing of repeating an action of advancing and retracting the cutting tool feeding mechanism 7 based on the operation result. As a result, the cutting tool 4 alternately moves between a solid line position and a broken line position as shown in FIG. 1, and vibrates at low frequency. As above, the motor controller 84 moves the cutting tool 4 from Point A (u0, w0) to Point B (U, W) while synchronizing the cutting tool 4 in two axial directions of the X-axis and the Z-axis and vibrates the cutting tool 4 by repeating the action of advance and retreat along the interpolation trajectory (Step S8). Consequently, the workpiece 2 can be machined by the cutting tool 4 made to vibrate at low frequency. Further, the vibration frequency of the cutting tool 4 having been output to the display 85 is displayed at the display portion 85.

According to the above described present embodiment, the cutting tool feed drive motor 7a which is a driving source of the cutting tool feeding mechanism 7 for feeding the cutting tool 4 for cutting the workpiece 2 is controlled by the control device 8 so as to vibrate the cutting tool 4 at low frequency. Accordingly, as shown in FIG. 1, cavitation is generated in a space K appearing between the workpiece 2 and the cutting tool 4, into which a coolant etc., used at the time of performing the cutting is sucked. Therefore, cutting heat and frictional heat generated at the time of machining the workpiece 2 can be cooled and lubricated effectively. As a result, according to the present embodiment, machining quality of workpieces can be stabilized.

Further, according to the present embodiment, the cutting tool 4 cuts the workpiece 2 while vibrating at low frequency, so that chips of the workpiece 2 are powdered by the low-frequency vibration, and this makes it difficult for the chips to catch on the cutting tool. Consequently, the quality can be stabilized and occurrence of fires can be inhibited.

Additionally, according to the present embodiment, only the cutting tool feed drive motor 7a is controlled by using the control device 8 in vibrating the cutting tool 4 at low frequency, so that the machine tool has the simple structure and thus is practical. Moreover, the cutting tool feed drive motor 7a can be controlled in the interpolation direction by using the control device 8, and thus, workpieces can be machined freely. Consequently, an effect is performed that the machining shape of workpieces is not limited.

Further, according to the present embodiment, the control device 8 controls the cutting tool 4 so as to synchronize in multiple axial directions and vibrate at low frequency, so that low-frequency vibration cutting capable of finely fragmenting chips can be realized.

On the other hand, according to the present embodiment, data for synchronizing the cutting tool 4 in multiple axial directions, feeding the cutting tool 4, and vibrating the cutting tool 4 at low frequency depending on the number of revolutions of the workpiece 2 and the feed of the cutting tool 4 per revolution of the workpiece 2 is prestored in vibration cutting information storage portion 83, and thus, low-frequency vibration cutting with optimum vibration capable of finely fragmenting chips can be realized.

Still further, according to the present embodiment, the low-frequency vibration cutting with optimum vibration can be performed as long as, at the time of preparing the NC program, the user prepares a program added with the vibration cutting command codes (the code of vibration cutting ON and the code of vibration cutting OFF) in addition to the program for performing the normal conventional cutting.

In this connection, the linear interpolation and the circular interpolation are illustrated by examples of the interpolation methods in the present embodiment. However, it is a matter of course that the interpolation methods are not restricted thereto and may be any interpolation methods such as a tapered interpolation.

Next, a second embodiment of the present invention will be described in detail with reference to FIG. 6. The same configurations as the first embodiment will be given the same numerals, and descriptions thereof will be omitted.

Figure 6:
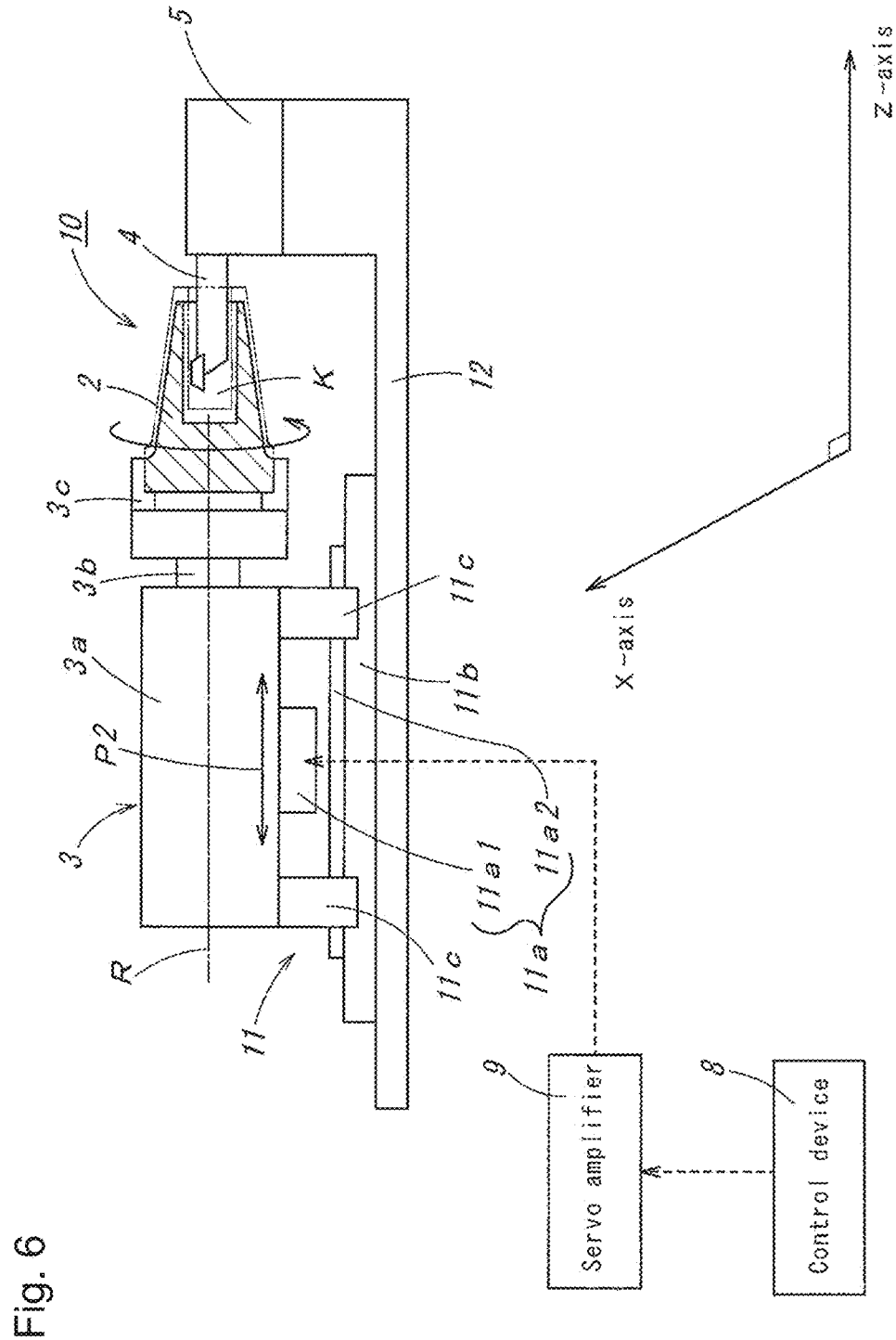
FIG. 6 is a block diagram showing a schematic configuration of a machine tool according to the second embodiment of the present invention.

A machine tool 10 according to the present embodiment is composed of a CNC lathe, and as shown in FIG. 6, includes a cutting tool holder 5 holding a cutting tool 4 for cutting a workpiece 2 which is an object to be machined, a rotation mechanism 3 for rotatably supporting the workpiece 2, a workpiece feed mechanism 11 for feeding the workpiece 2 provided on a lower portion of the rotation mechanism 3, advanceably and retreatably (see arrow P2) with respect to the cutting tool 4, and a control device 8 for controlling operation of the workpiece feed mechanism 11 via a servo amplifier 9 so as for the workpiece 2 to vibrate at a desired low frequency. It is noted that only the workpiece feed mechanism 11 on the Z-axis is shown in FIG. 6 but the machine tool also has a workpiece feed mechanism on the X-axis orthogonal thereto.

The workpiece feed mechanism 11 has a workpiece feed drive motor 11a composed of a linear servomotor which is a driving source for feeding the workpiece 2 advanceably and retreatably (see arrow P2) with respect to the cutting tool 4. This workpiece feed drive motor 11a is constituted of a needle 11 a1 and a stator 11a2. The needle 11a1 is formed by winding an exciting coil around a magnetic substance structure, and the stator 11a2 is formed by lining up multiple magnets in the longitudinal direction.

This needle 11a1 is provided on a lower portion of a spindle motor 3a of the rotation mechanism 3, and the stator 11a2 is provided on an upper portion of a guide rail 11b provided on an upper end portion of a base 12. On the lower portion of the spindle motor 3a, a pair of guides 11c guiding the spindle motor 3a so as to move along the guide rail 11b are provided. Further, on the other upper end portion of the base 12, the foregoing cutting tool holder 5 is provided.

To move the thus configured workpiece feed mechanism 11 advanceably and retreatably (see arrow P2) with respect to the cutting tool 4, the servo amplifier 9 delivers to the needle 11a1 a current based on a command having been sent from the control device 8, first. By this, magnetic poles of the needle 11 al and stator 11a2 attract and repel each other, and then, thrust in the front-rear direction (see arrow P2) is generated. Accompanying the thrust, the spindle motor 3a moves in the front-rear direction (see arrow P2). In the movement of the spindle motor 3a accompanying the thrust, the pair of guides 11c are provided, so that the spindle motor 3a moves along the guide rail 11b through means of the pair of guides 11c. As a result, the workpiece feed mechanism 11 can be moved advanceably and retreatably (see arrow P2) with respect to the cutting tool 4. It is noted that the linear servomotor is used as the workpiece feed drive motor 11a in the present embodiment, but not restricted thereto, any linear motors may be used. Further, not restricted to the linear motors, servomotors may be used. However, ball screws are used at the time of employing the servomotors. Thus, vibration is absorbed if backlash occurs during the advance and retreat movement of the workpiece feed mechanism. Accordingly, it is preferable to use the linear motors allowing direct control and not requiring ball screws etc.

Next, a method for synchronizing the workpiece 2 of the above configured machine tool 10 in multiple axial directions (two axial directions of the X-axis and the Z-axis in the drawing), alternately moving the workpiece 2 between a solid line position and a broken line position as shown in FIG. 6, and cutting the workpiece 2 by the cutting tool 4 while vibrating the workpiece 2 will be described. It is noted that this method is almost the same as that of the first embodiment, and thus, only points differing from the first embodiment will be described.

In the vibration cutting information storing portion 83, data for synchronizing the workpiece 2 in multiple axial directions (two axial directions of the X-axis and the Z-axis in the drawing) and feeding and vibrating the workpiece 2 at low frequency, that is, the vibration cutting information table VC_TBL (see FIG. 3) is stored. In this vibration cutting information table VC_TBL (see FIG. 3), an advance distance (mm) of the workpiece feed mechanism 11, a retreat distance (mm) of the workpiece feed mechanism 11, a forward speed (mm/min) of the workpiece feed mechanism 11, a rearward speed (mm/min) of the workpiece feed mechanism 11, and a vibration frequency (Hz) of the workpiece 2 corresponding to the number of revolutions (rpm) of the workpiece 2 and the feed (mm) per revolution of the workpiece 2 having been programmed by the user by means of the input portion 81 are stored. Thus, the central control portion 80 selects the advance distance of the workpiece feed mechanism 11, the retreat distance of the workpiece feed mechanism 11, the forward speed of the workpiece feed mechanism 11, the rearward speed of the workpiece feed mechanism 11, and the vibration frequency of the workpiece 2 corresponding to the number of revolutions of the workpiece 2 and the feed per revolution of the workpiece 2 having been programmed by the user by means of the input portion 81. The central control portion 80 then performs operation processing on advance and retreat movement along the interpolation trajectory according to the program information on the interpolation method to Point B which is the destination of the workpiece 2, stored in the program information storing portion 82 and the above selected information (the advance distance of the workpiece feed mechanism 11, the retreat distance of the workpiece feed mechanism 11, the forward speed of the workpiece feed mechanism 11, and the rearward speed of the workpiece feed mechanism 11). The central control portion 80 then outputs the operation result to the motor controller 84 and concurrently outputs the above selected vibration frequency of the workpiece 2 to the display 85.

The motor controller 84 synchronizes the workpiece 2 in multiple axial directions (two axial directions of the X-axis and the Z-axis in the drawing) and controls the workpiece 2 so as to move alternately between the solid line position and the broken line position as shown in FIG. 6, based on the foregoing operation result. As a result, the workpiece 2 is cut by the cutting tool 4 while vibrating at low frequency. Further, the vibration frequency of the workpiece 2 having been output to the display 85 is displayed at the display portion 85.

Since the present embodiment and the first embodiment only differ in target for vibrating at low frequency, the present embodiment performs a similar effect as the first embodiment.

Next, a third embodiment according to the present invention will be described in detail with reference to FIG. 7. It is noted that the same configurations as the first and second embodiments will be given the same numerals and descriptions thereof will be omitted.

Figure 7:
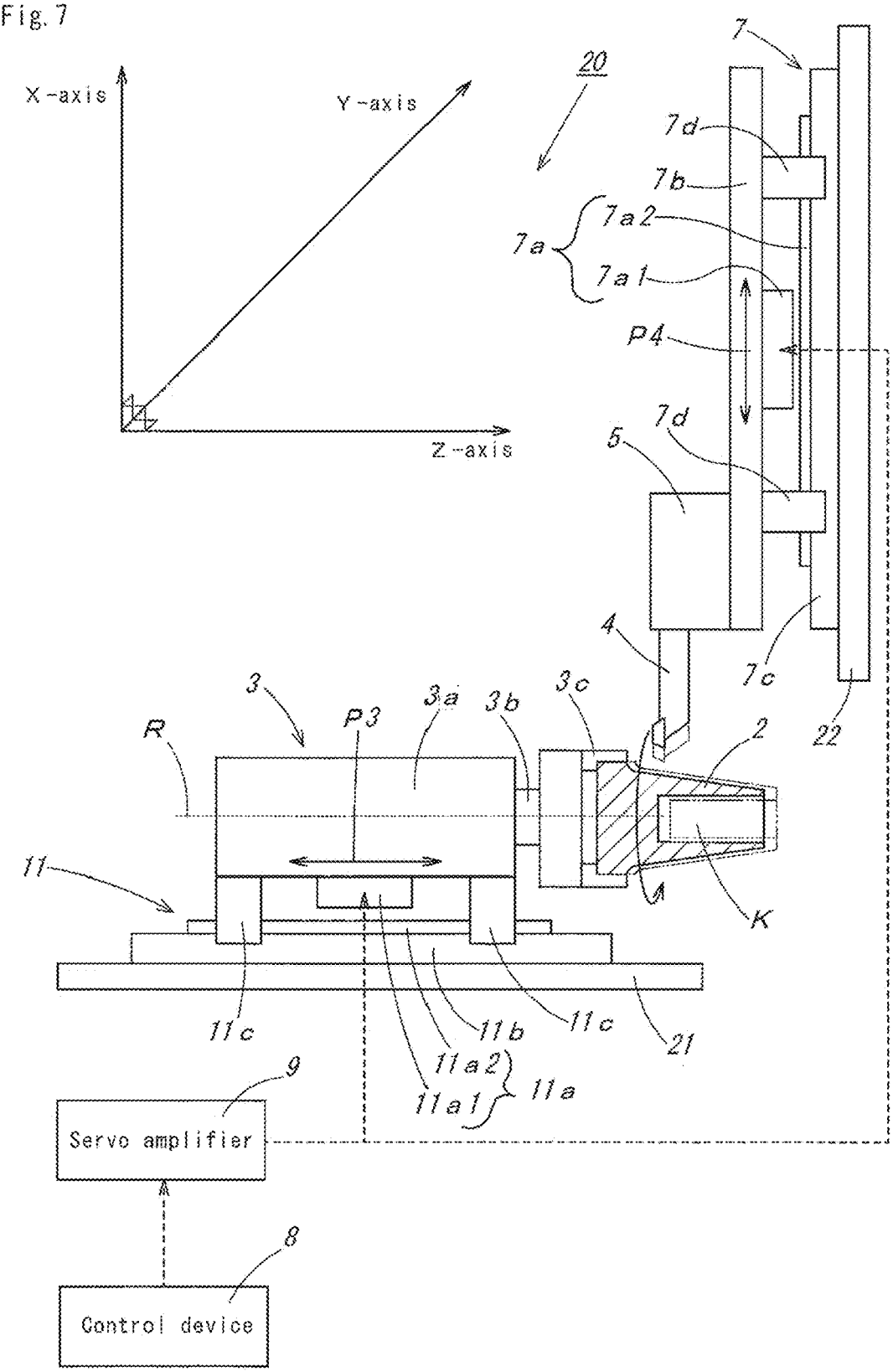
FIG. 7 is a block diagram showing a schematic configuration of a machine tool according to the third embodiment of the present invention.

A machine tool 20 according to the present embodiment is composed of a CNC lathe, and as shown in FIG. 7, includes on the Z-axis a rotation mechanism 3 for rotatably supporting a workpiece 2 which is an object to be machined, and a workpiece feed mechanism 11 provided on a lower portion of the rotation mechanism 3 and advanceably and retreatably (see arrow P3) feeding the workpiece 2 provided on a base 21. On the X-axis perpendicular to the Z-axis, a cutting tool feeding mechanism 7 for advanceably and retreatably (see arrow P4) feeding a cutting tool 4 for cutting the workpiece 2 is provided on a base 22. In addition, the machine tool 20 is equipped with a control device 8 for individually controlling operations of the cutting tool feeding mechanism 7 and the workpiece feed mechanism 11 via a servo amplifier 9 so as for the cutting tool 4 and the workpiece 2 to vibrate at a desired low frequency. It is noted that only the workpiece feed mechanism 11 on the Z-axis and the cutting tool feeding mechanism 7 on the X-axis are shown in FIG. 7 but the machine also tool has a workpiece feed mechanism and a cutting tool feeding mechanism on the Y-axis orthogonal to X- and Y-axes.

Subsequently, a method for cooperatively synchronizing the workpiece 2 and the cutting tool 4 of the above configured machine tool 20 in multiple axial directions (three axial directions of the X-axis, the Z-axis, and the Y-axis in the drawing), alternately moving them between solid line positions and broken line positions as shown in FIG. 7, and cutting the workpiece 2 by the cutting tool 4 while vibrating them will be described using FIG. 8 too. It is noted that this method is almost the same as that of the first embodiment, and thus, only points differing from the first embodiment will be described.

In the vibration cutting information storing portion 83, data for synchronizing the workpiece 2 and the cutting tool 4 in multiple axial directions (three axial directions of the X-axis, the Z-axis, and the Y-axis in the drawing) and feeding and vibrating them at low frequency, that is, the vibration cutting information table VC_TBL (see FIG. 3) is stored. In this vibration cutting information table VC_TBL (see FIG. 3), advance distances (mm) of the cutting tool feeding mechanism 7 and the workpiece feed mechanism 11, retreat distances (mm) of the cutting tool feeding mechanism 7 and the workpiece feed mechanism 11, forward speeds (mm/min) of the cutting tool feeding mechanism 7 and the workpiece feed mechanism 11, rearward speeds (mm/min) of the cutting tool feeding mechanism 7 and the workpiece feed mechanism 11, and vibration frequencies (Hz) of the cutting tool 4 and the workpiece 2 corresponding to the number of revolutions (rpm) of the workpiece 2 and feeds (mm) of the cutting tool 4 and the workpiece 2 per revolution of the workpiece 2 having been programmed by the user by means of the input portion 81 are stored. Thus, the central control portion 80 selects the advance distances of the cutting tool feeding mechanism 7 and the workpiece feed mechanism 11, the retreat distances of the cutting tool feeding mechanism 7 and the workpiece feed mechanism 11, the forward speeds of the cutting tool feeding mechanism 7 and the workpiece feed mechanism 11, the rearward speeds of the cutting tool feeding mechanism 7 and the workpiece feed mechanism 11, and the vibration frequencies of the cutting tool 4 and the workpiece 2 corresponding to the number of revolutions of the workpiece 2 and the feeds of the cutting tool 4 and the workpiece 2 per revolution of the workpiece 2 having been programmed by the user by means of the input portion 81. The central control portion 80 then performs operation processing on advance and retreat movement along the interpolation trajectory according to the program information on the interpolation method to Point B which is the destination of the workpiece 2 and the cutting tool 4, stored in the program information storing portion 82 and the above selected information (the advance distances of the cutting tool feeding mechanism 7 and the workpiece feed mechanism 11, the retreat distances of the cutting tool feeding mechanism 7 and the workpiece feed mechanism 11, the forward speeds of the cutting tool feeding mechanism 7 and the workpiece feed mechanism 11, and the rearward speeds of the cutting tool feeding mechanism 7 and the workpiece feed mechanism 11). The central control portion 80 then outputs the operation result to the motor controller 84 and concurrently outputs the above selected vibration frequencies of the cutting tool 4 and the workpiece 2 to the display portion 85.

The motor controller 84 controls the cutting tool 4 and the workpiece 2 so as to move alternately between the solid line positions and the broken line positions as shown in FIG. 7, based on the foregoing operation result. As a result, the workpiece 2 is cut by the cutting tool 4. Further, the vibration frequencies of the cutting tool 4 and the workpiece 2 having been output to the display portion 85 are displayed at the display portion 85.

Meanwhile, the cutting tool 4 and the workpiece 2 which vibrate at low frequency operate in cooperative synchronization with each other but do not operate independently as described above. This will be described using FIG. 8.

Figure 8:
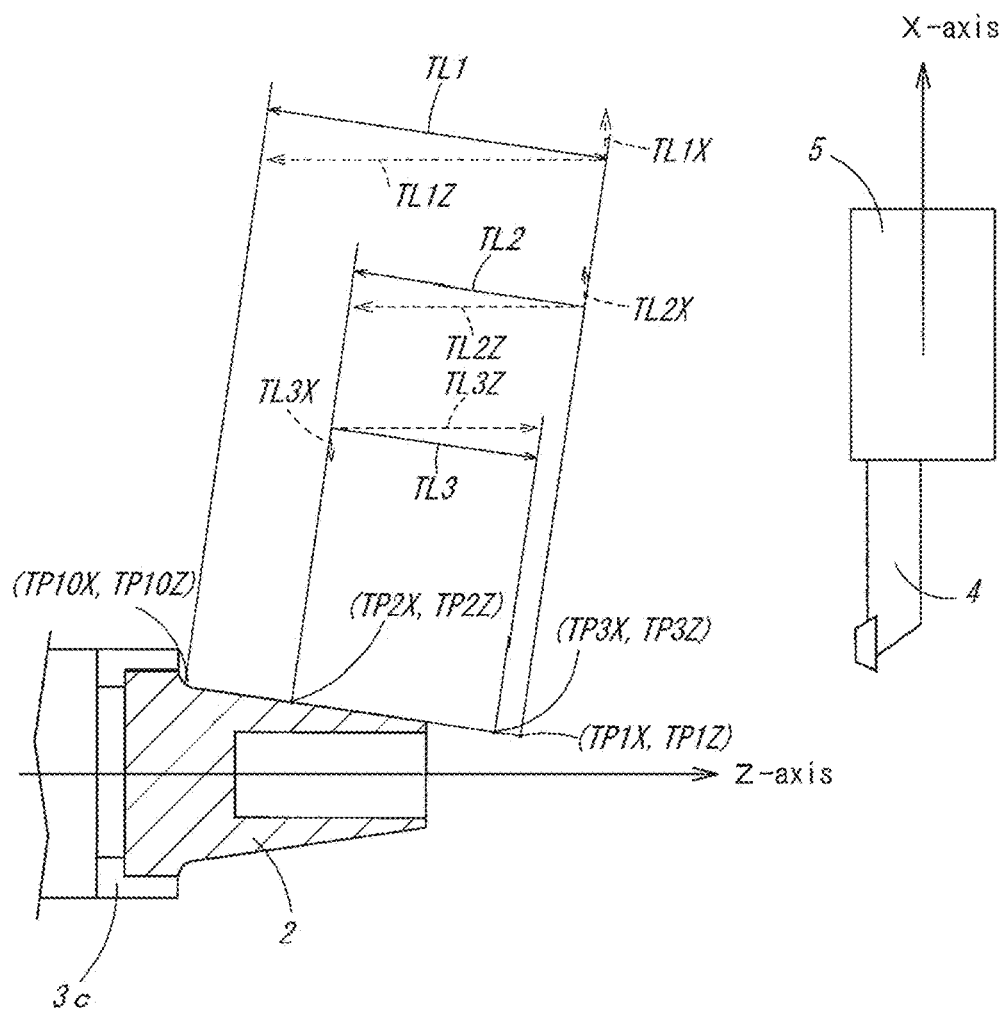
FIG. 8 is an explanatory diagram for explaining the movement of the machine tool according to the same embodiment.

FIG. 8 is a diagram for explaining the procedure to cut the workpiece 2 by using the cutting tool 4 with two axes of the X-axis and the Z-axis in cooperative synchronization. Herein, an instance will be shown where the workpiece 2 is moved along the Z-axis by a distance TL1Z from Point TP1Z to Point TP10Z and further the cutting tool 4 is moved along the X-axis by a distance TL1X from Point TP1X to Point TP10X.

First, when attempting to advance the workpiece 2 and the cutting tool 4 by a distance TL2 from Point (TP1X, TP1Z) to Point (TP2X, TP2Z), the workpiece 2 is advanced along the Z-axis by a distance TL2Z and the cutting tool 4 is advanced along the X-axis by a distance TL2X. Then, the workpiece 2 and the cutting tool 4 can be advanced by a distance TL2 while cooperatively synchronizing with the two X- and Z-axes.

When attempting to retract the workpiece 2 and the cutting tool 4 by a distance TL3 to Point (TP3X, TP3Z) after reaching Point (TP2X, TP2Z), the workpiece 2 is retracted along the Z-axis by a distance TL3Z and the cutting tool 4 is retracted along the X-axis by a distance TL3X. Then, the workpiece 2 and the cutting tool 4 can be retracted by a distance TL3 while cooperatively synchronizing with the two X- and Z-axes.

As above, the operation of advancing the workpiece 2 and the cutting tool 4 by the distance TL2, that is, advancing the workpiece 2 along the Z-axis by the distance TL2Z and advancing the cutting tool 4 along the X-axis by the distance TL2X, and retracting the workpiece 2 and the cutting tool 4 by the distance TL3, that is, retracting the workpiece 2 along the Z-axis by the distance TL3Z and retracting the cutting tool 4 along the X-axis by the distance TL3X is repeated, whereby the cutting tool 4 and the workpiece 2 are moved by a distance TL1 from Point (TP1X, TP1Z) to Point (TP10X, TP10Z).

Consequently, the workpiece 2 can be cut by the cutting tool 4 along a straight line (a taper) joined from the position of Point (TP1X, TP1Z) to Point (TP10X, TP10Z).

As described above, the cutting tool 4 and the workpiece 2 which vibrate at low frequency operate with the two axes of the X-axis and the Z-axis synchronized cooperatively, but do not operate independently. Accordingly, the operations of the cutting tool 4 and the workpiece 2 are such that the workpiece 2 looks as it has stopped when viewed from the cutting tool 4 side and the cutting tool 4 looks as it has stopped when viewed from the workpiece 2 side. Therefore, the operations in the present embodiment are substantially the same as that of the cutting tool 4 illustrated in the first embodiment or the operation of the workpiece 2 illustrated in the second embodiment. Further, on the occasion of three axes including the Y-axis orthogonal to X- and Z-axes, the three axes operate while cooperatively synchronizing.

Therefore, the present embodiment and the first embodiment only differ in target for vibrating at low frequency, and thus, the present embodiment performs a similar effect as the first embodiment.

Further, examples of rotating the workpiece 2 and cutting the workpiece 2 by the cutting tool 4 are given in the first to third embodiments. However, the present invention can be applied to machine tools according to the fourth and fifth embodiments of rotating the cutting tool 4 and cutting the workpiece 2 by the cutting tool 4 as shown in FIG. 9 and FIG. 10, for example.

Figure 9:
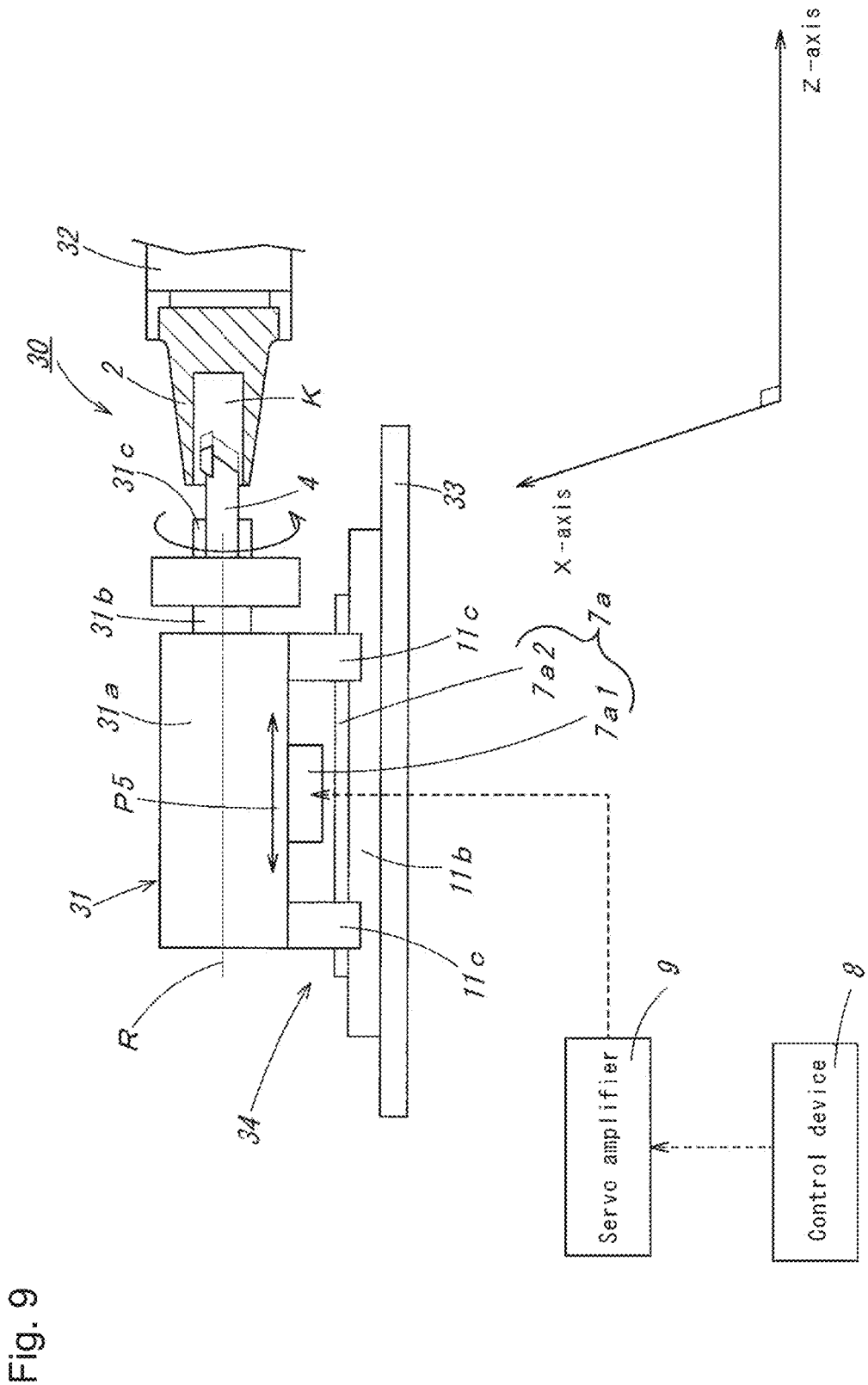
FIG. 9 is a block diagram showing a schematic configuration of a machine tool according to the fourth embodiment of the present invention.
Figure 10:
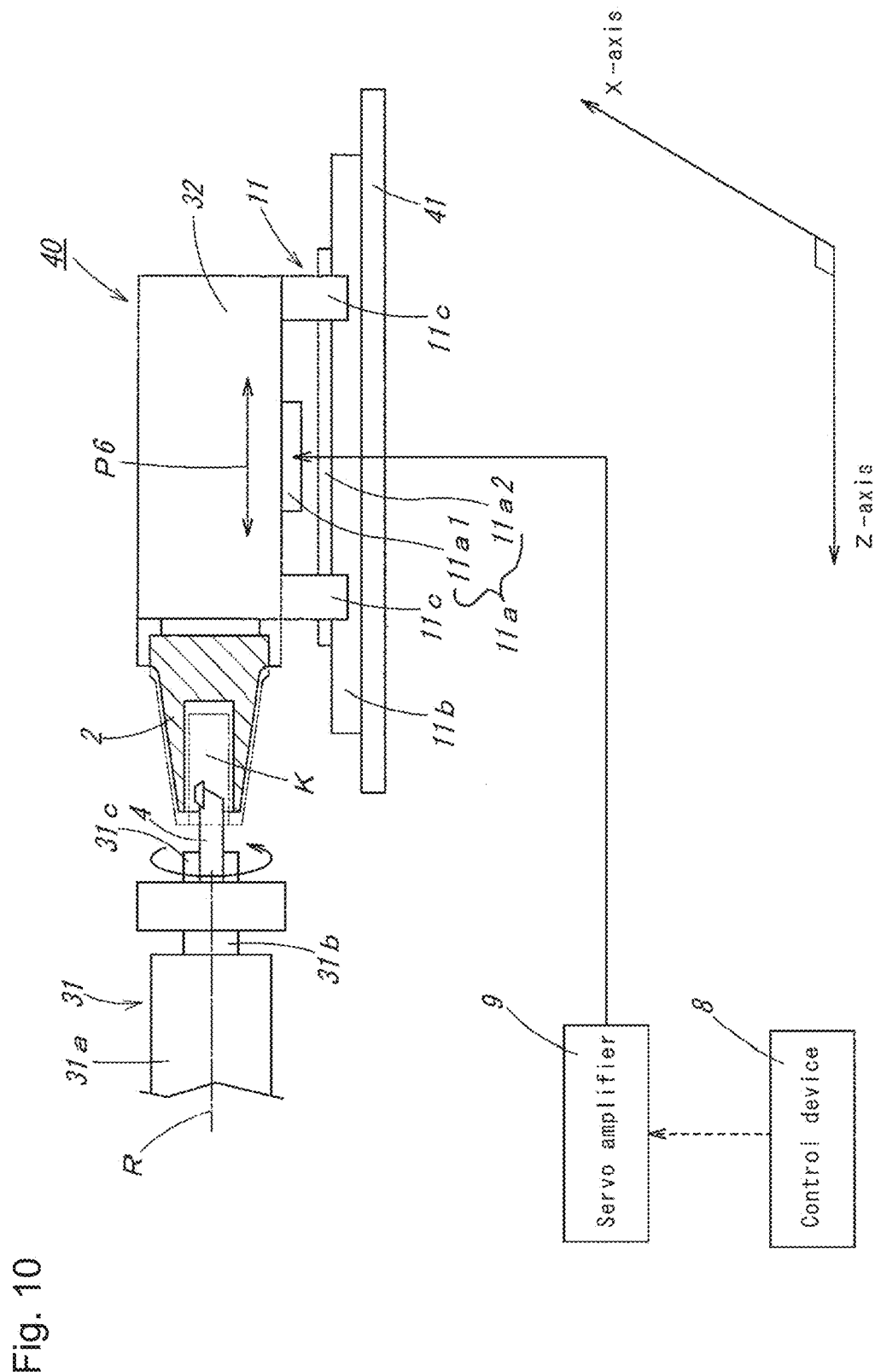
FIG. 10 is a block diagram showing a schematic configuration of a machine tool according to the fifth embodiment of the present invention.

More specifically, a machine tool 30 according to a fourth embodiment shown in FIG. 9 is composed of a CNC lathe and includes a workpiece chuck mechanism 32 for supporting a workpiece 2 which is an object to be machined, a rotation mechanism 31 for rotatably supporting a cutting tool 4 for cutting the workpiece 2, and a cutting tool feeding mechanism 34 provided on a lower portion of the rotation mechanism 31 and advanceably and retreatably (see arrow P5) feeding the cutting tool 4 provided on a base 33. The machine tool 30 is equipped with a control device 8 for controlling operation of the cutting tool feeding mechanism 34 via a servo amplifier 9 so as for the cutting tool 4 to vibrate at a desired low frequency. It is noted that only the cutting tool feeding mechanism 34 on the Z-axis is shown in FIG. 9 but the machine tool also has a cutting tool feeding mechanism on the X-axis orthogonal thereto. Further, the configuration of the cutting tool feeding mechanism 34 is almost the same as that of the workpiece feed mechanism 11 and only the workpiece feed drive motor 11a is replaced with the cutting tool feed drive motor 7a. Thus, the same numerals will be given and descriptions thereof will be omitted.

On the other hand, the foregoing rotation mechanism 31 has a spindle motor 31a, and to a main shaft 31b of the spindle motor 31a, a cutting tool chuck mechanism 31c is rotatably attached. The cutting tool 4 is gripped by the cutting tool chuck mechanism 31c, and the gripped cutting tool 4 is configured to be rotationally driven about a rotation axis R by rotation drive of the spindle motor 31a. Further, a method for alternately moving the cutting tool 4 of the thus configured machine tool 30 between a solid line position and a broken line position as shown in FIG. 9, and cutting the workpiece 2 while vibrating the cutting tool 4 is almost the same as that of the first embodiment. Only the point that program setting values corresponding to the data stored in the vibration cutting information table VC_TBL (see FIG. 3) stored in the vibration cutting information storing portion 83 are the number of revolutions (rpm) of the cutting tool 4 and a feed (mm) of the cutting tool 4 per revolution thereof having been programmed by the user through means of the input portion 81 is different and the others are identical.

<Fifth Embodiment>

On the other hand, a machine tool 40 according to the fifth embodiment shown in FIG. 10 is composed of a CNC lathe and includes a workpiece chuck mechanism 32 for supporting a workpiece 2 which is an object to be machined, a rotation mechanism 31 for rotatably supporting a cutting tool 4 for cutting the workpiece 2, and a workpiece feed mechanism 11 provided on a lower portion of the workpiece chuck mechanism 32 and advanceably and retreatably (see arrow P6) feeding the workpiece 2 provided on a base 41. The machine tool 40 is equipped with a control device 8 for controlling operation of the workpiece feed mechanism 11 via a servo amplifier 9 so as for the workpiece 2 to vibrate at a desired low frequency. It is noted that only the workpiece feed mechanism 11 on the Z-axis is shown in FIG. 10 but the machine tool also has a workpiece feed mechanism on the X-axis orthogonal thereto. Further, the same configurations as that of the machine tool 20 of the second embodiment and as that of the machine tool 30 shown in FIG. 9 will be given the same numerals, and descriptions thereof will be omitted.

A method for alternately moving the workpiece 2 of the thus configured machine tool 40 between a solid line position and a broken line position as shown in FIG. 10 and vibrating the workpiece 2 is almost the same as that of the second embodiment. Only the point that program setting values corresponding to the data stored in the vibration cutting information table VC_TBL (see FIG. 3) stored in the vibration cutting information storing portion 83 are the number of revolutions (rpm) of the cutting tool 4 and the feed (mm) of the workpiece 2 per revolution of the cutting tool 4 having been programmed by the user through means of the input portion 81 is different and the others are identical.

EXAMPLES

Next, examples and a comparative example will be used to describe the present invention in more detail.

Example 1

As a first example, the machine tool 20 according to the third embodiment was used to perform the machining of a workpiece 2. An automatic lathe L16CNC manufactured by CITIZEN MACHINERY CO., LTD. was used as the machine tool 20. A bar SKD11-$\varphi$12.0 was used as the workpiece 2, and a turning tool with a diameter of 12 mm was used as the cutting tool 4. Further, a combination of a ball screw and a servomotor was used as the cutting tool feeding mechanism 7. The number of revolutions of the workpiece 2 was programmed at 600 rpm, and feeds of the cutting tool 4 and the workpiece 2 per revolution of the workpiece 2 were each programmed at 0.01 mm, and then the cutting of the workpiece 2 was performed. As a consequence, a machined workpiece shown in FIG. 11 could be produced. It is noted that the amplitude of low-frequency vibration of the cutting tool 4 and the workpiece 2 according to the foregoing programmed values was each set at 0.03 and the frequency was each set at 9 Hz.

Figure 11:
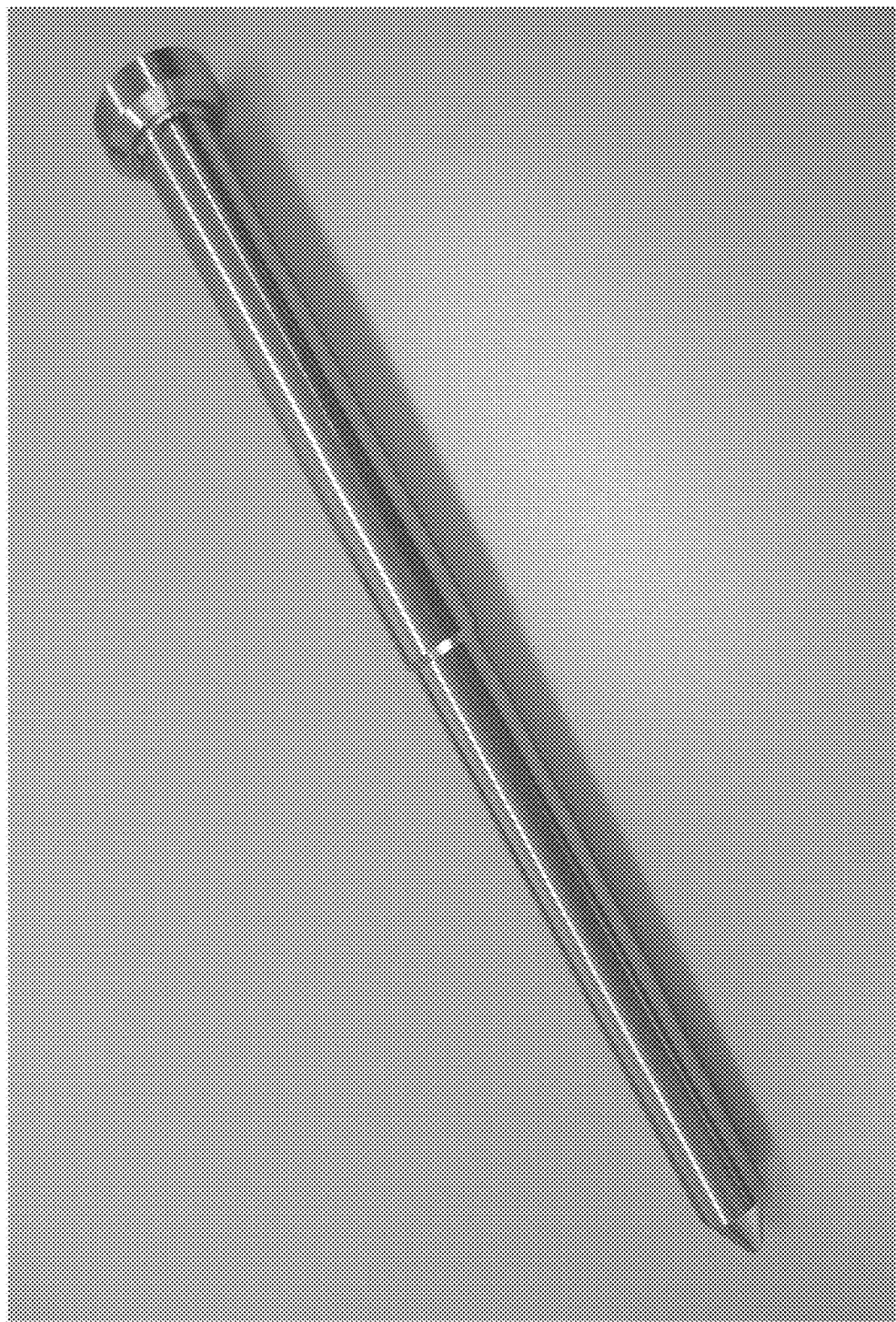
FIG. 11 is a photograph showing a machined workpiece obtained when a workpiece is cut with low-frequency vibration by using the machine tool of Example 1.

On the other hand, the same machine was used without setting the frequency to produce a machined workpiece having the machining shape as shown in FIG. 11 by the conventional cutting. However, the cutting itself was impossible due to tool breakage derived from resonance.

From the above, it can be seen that the low-frequency vibration cutting is of low cutting resistance and markedly excellent in machining performance as compared with the conventional cutting. Further, the machine tool 100 attached with the vibration exciter to the cutting tool thereof as shown in FIG. 13 has the problem described above, and thus, cannot machine the tapered shape of the distal end portion of the machined workpiece shown in FIG. 11.

Example 2

Figure 12:
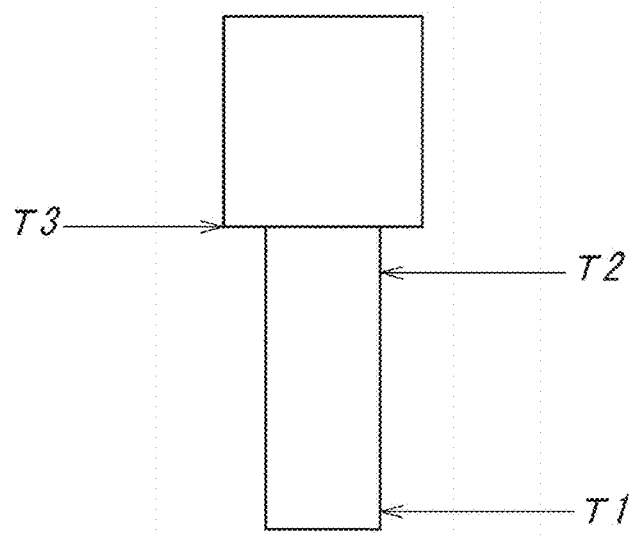
FIG. 12 is a photograph of a machined workpiece obtained when a workpiece is cut by using the machine tool of Example 2 or Comparative Example 1.

Next, as a second example, the machine tool 1 according to the first embodiment was used to machine a workpiece 2 by the low-frequency vibration cutting in order to produce a machined workpiece shown in FIG. 12. A CNC lathe NL-10 manufactured by CITIZEN MACHINERY CO., LTD. was used as the machine tool 1. A bar φ10-SUS304 was used as the workpiece 2, and DCGT11T304ER-U-PR930 manufactured by KYOCERA Corporation was used as the cutting tool 4. Further, a linear servomotor manufactured by Mitsubishi Electric Corporation was used as the cutting tool feeding mechanism 7. The number of revolutions of the workpiece 2 was programmed at 3750 rpm, and the feed of the cutting tool 4 per revolution of the workpiece 2 was programmed at 0.01 mm, and SUNCUT EF-5N (water-insoluble) manufactured by NIPPON GREASE CO., LTD. was used as the coolant. Further, the amplitude of low-frequency vibration of the cutting tool 4 according to the foregoing programmed values was set at 0.03 and the frequency at 48 Hz.

Comparative Example 1

On the other hand, as a first comparative example, the machine tool 1 according to the first embodiment was used to machine a workpiece 2 by the conventional cutting in order to produce a machined workpiece shown in FIG. 12. A CNC lathe NL-10 manufactured by CITIZEN MACHINERY CO., LTD. was used as the machine tool 1. A bar φ10-SUS304 was used as the workpiece 2, and DCGT11T304ER-U-PR930 manufactured by KYOCERA Corporation was used as the cutting tool 4. Further, a linear servomotor manufactured by Mitsubishi Electric Corporation was used as the cutting tool feeding mechanism 7. The feed per revolution was set at 28 mm/min such that the cutting time was made the same as the low-frequency vibration cutting of the foregoing Example 2. Further, SUNCUT EF-5N (water-insoluble) manufactured by NIPPON GREASE CO., LTD. was used as the coolant.

<Evaluation of Cutting Accuracy>

The diameter of T1 and T2 (see FIG. 12) of the machined workpieces having been obtained in the above Example 2 and Comparative Example 1 were measured, and a burr of T3 (see FIG. 12) was measured. The measurement result will be shown in Table 1.

TABLE 1

|  | Example 2 | Comparative Example 1 |
|---|---|---|
| T1 | Φ 7.001 | Φ 7.001 |
| T2 | Φ 7.000 | Φ 6.997 |
| T3 | Φ 10.043 | Φ 10.081 |

As shown in the above Table 1, a diameter difference between T1 and T2 in Example 2 was small, whereas a diameter difference between T1 and T2 in Comparative Example 1 was large. Further, the burr of T3 in Comparative Example 1 was larger than that of T3 in Example 2. From this, it can be seen that the low-frequency vibration cutting is high in machining accuracy and can inhibit work hardening as compared with the conventional cutting.

In the present embodiment, examples employing two or three axis CNC lathes are illustrated as the machine tools according to the foregoing first to fifth embodiments. However, a wide variety of machine tools can be used without being restricted thereto.

What is claimed is:
1. A machine tool comprising:
a cutting tool holding means for holding a cutting tool for machining a workpiece;
a workpiece holding means for holding the workpiece;
a feeding mechanism operable to feed at least one of the cutting tool or the workpiece such that the cutting tool is fed relative to the workpiece in multiple axial directions, where the multiple axial directions include at least a direction along an X axis and a direction along a Z axis orthogonal to the X axis;
the feeding mechanism including an X axis motor operable to relatively move the cutting tool and workpiece along the X axis, and including a Z axis motor operable to relatively move the cutting tool and workpiece along the Z axis;
a control device for controlling the X axis motor and the Z axis motor;
to relatively move the cutting tool and workpiece along both the X and Z axes, from a first point to a second point, the control device being operable to determine an interpolation trajectory between the first and second points according to a predetermined interpolation method, and being operable to determine repeating advancing and retreating movements of the cutting tool relative to the workpiece along the interpolation trajectory, where the repeating advancing and retreating movements are operable to relatively feed the cutting tool and workpiece along the interpolation trajectory from the first point to the second point and to simultaneously relatively vibrate the cutting tool and workpiece at a low frequency along the interpolation trajectory; and
the control device being operable to control the X axis motor and Z axis motor to cause the repeating advancing and retracting movements of the cutting tool relative to the workpiece to relatively feed the cutting tool and workpiece along the interpolation trajectory from the first point to the second point and to simultaneously relatively vibrate the cutting tool and workpiece at a low frequency along the interpolation trajectory.
2. The machine tool according to claim 1, wherein the feeding mechanism is operable to move the cutting tool holding means in the multiple axial directions.

3. The machine tool according to claim 1, wherein the feeding mechanism is operable to move the workpiece holding means in the multiple axial directions.

4. The machine tool according to claim 1, wherein the feeding mechanism is operable to move the cutting tool holding means and the workpiece holding means, and the cutting tool holding means and the workpiece holding means cooperatively move to feed the cutting tool relative to the workpiece in the multiple axial directions.

5. The machine tool according to claim 1, further comprising a vibration cutting information storing means for prestoring data for relatively vibrating the workpiece and the cutting tool at the low frequency, wherein the control device exercises control based on the data stored in the vibration cutting information storing means.

* * * * *